US009644650B2

(12) United States Patent
Kim

(10) Patent No.: US 9,644,650 B2
(45) Date of Patent: May 9, 2017

(54) DRIVER SELF-TUNING METHOD USING ELECTRO-HYDRAULIC ACTUATOR SYSTEM

(75) Inventor: Ji-Yun Kim, Changwon-si (KR)

(73) Assignee: VOLVO CONSTRUCTION EQUIPMENT AB (SE)

( * ) Notice: Subject to any disclaimer, the term of this patent is extended or adjusted under 35 U.S.C. 154(b) by 387 days.

(21) Appl. No.: 14/365,475

(22) PCT Filed: Dec. 16, 2011

(86) PCT No.: PCT/KR2011/009732
§ 371 (c)(1),
(2), (4) Date: Jun. 13, 2014

(87) PCT Pub. No.: WO2013/089299
PCT Pub. Date: Jun. 20, 2013

(65) Prior Publication Data
US 2014/0350731 A1 Nov. 27, 2014

(51) Int. Cl.
*G06F 19/00* (2011.01)
*F15B 21/08* (2006.01)
(Continued)

(52) U.S. Cl.
CPC .......... *F15B 21/082* (2013.01); *F15B 19/002* (2013.01); *E02F 9/2095* (2013.01);
(Continued)

(58) Field of Classification Search
CPC ...... G05B 15/02; F15B 21/082; F15B 19/002; F15B 2211/6346; F15B 2211/6658;
(Continued)

(56) References Cited

U.S. PATENT DOCUMENTS 5,223,778 A * 6/1993 Svarovsky ........... G05B 13/042
318/609
6,330,502 B1 12/2001 Cetinkunt et al.
(Continued)

FOREIGN PATENT DOCUMENTS

EP 0301096 A1 2/1989
EP 1420170 A1 5/2004
(Continued)

OTHER PUBLICATIONS

Extended European Search Report issued by European Patent Office (EPO) on Sep. 16, 2015 regarding Application No. 11877421.5 (6 pages).
(Continued)

*Primary Examiner* — Michael D Masinick
(74) *Attorney, Agent, or Firm* — Harness, Dickey & Pierce, P.L.C.

(57) ABSTRACT

The present invention relates to a driver self-tuning method using an electro-hydraulic actuator system, the method comprising: a step in which a specific EHA system is selected by a HMI; a step of displaying a graph defining the mapping relationship of an actuator speed command with respect to a joystick command of the selected EHA system; a step in which, when a predetermined button is pressed by a user, the actuator maximum speed is tuned by multiplying the maximum speed value of the actuator of the selected EHA system, which has been pre-stored, by gain that increases or decreases in proportion to the number of times the button was pressed; and a step of storing the tuned actuator maximum speed in the upper controller of the EHA system. Equipment using the electro-hydraulic actuator system makes it possible to directly tune actuator speed characteristics that cannot be achieved with existing equipment using, by way of example, HMI display equipment and operating buttons.

8 Claims, 3 Drawing Sheets

(51) Int. Cl.

| | |
|---|---|
| ***F15B 19/00*** | (2006.01) |
| *E02F 9/22* | (2006.01) |
| *E02F 9/20* | (2006.01) |

(52) U.S. Cl.
CPC ........... *E02F 9/2203* (2013.01); *E02F 9/2289* (2013.01); *F15B 21/087* (2013.01); *F15B 2211/20515* (2013.01); *F15B 2211/20561* (2013.01); *F15B 2211/20569* (2013.01); *F15B 2211/20576* (2013.01); *F15B 2211/30515* (2013.01); *F15B 2211/6346* (2013.01); *F15B 2211/6651* (2013.01); *F15B 2211/6658* (2013.01); *F15B 2211/7053* (2013.01)

(58) Field of Classification Search
CPC .... F15B 2211/6651; F15B 2211/20576; F15B 2211/20561; F15B 2211/20569; F15B 2211/30515; F15B 2211/7053; F15B 2211/20515; E02F 9/2289; E02F 9/2095
See application file for complete search history.

(56) References Cited

U.S. PATENT DOCUMENTS

| | | | | |
|---|---|---|---|---|
| 6,817,277 | B2 | 11/2004 | Yoshino | |
| 8,720,197 | B2 * | 5/2014 | Persson ................. | E02F 9/2217 60/456 |
| 8,793,023 | B2 * | 7/2014 | Vanderlaan ............. | E02F 9/207 700/275 |
| 9,223,302 | B2 * | 12/2015 | Maurer ............... | H02P 29/0044 |
| 2004/0060205 | A1 | 4/2004 | Yoshino | |
| 2011/0000203 | A1 | 1/2011 | Riedel et al. | |
| 2011/0030364 | A1 * | 2/2011 | Persson ................. | E02F 9/2217 60/428 |
| 2011/0208363 | A1 * | 8/2011 | Vanderlaan ............. | E02F 9/207 700/282 |
| 2014/0214283 | A1 * | 7/2014 | Maurer ............... | H02P 29/0044 701/49 |
| 2014/0230643 | A1 * | 8/2014 | Kim ...................... | E02F 9/2271 91/1 |

FOREIGN PATENT DOCUMENTS

| | | | | |
|---|---|---|---|---|
| JP | 2003065301 A | | 3/2003 | |
| JP | 2007113304 A | | 5/2007 | |
| KR | 1020100024737 A | | 3/2010 | |
| KR | 1020100127751 A | | 12/2010 | |
| WO | WO 2010030830 A1 | * | 3/2010 | .............. E02F 9/207 |
| WO | WO-2010030830 A1 | | 3/2010 | |

OTHER PUBLICATIONS

International Search Report (in English and Korean) and Written Opinion (in Korean) for PCT/KR2011/009732, mailed Sep. 28, 2012; ISA/KR.

* cited by examiner

DRIVER SELF-TUNING METHOD USING ELECTRO-HYDRAULIC ACTUATOR SYSTEM

FIELD OF THE INVENTION

The present invention relates to an operator self-tuning method using an electro-hydraulic actuator system. More particularly, the present invention relates to an operator self-tuning method using an electro-hydraulic actuator system, in which an operator can personally tune a lookup table of a joystick command vs. an actuator speed command through a human machine interface (HMI) display instrument in a machine including a plurality of electro-hydraulic actuator systems, so that the operator can personally tune the acceleration characteristics of the actuator to desired actuator speed characteristics, unlike a machine including only existing fixed actuator speed characteristics.

BACKGROUND OF THE INVENTION

In a machine including a conventional hydraulic actuator system, once a spool design is determined, the speed characteristics of the actuator cannot be modified as long as the spool is not replaced. In addition, since an operator cannot personally modify the speed characteristics of the actuator, it is impossible for the operator to tune the actuator speed characteristics actually. However, in a machine including hydraulic actuator system, the operator can personally tune the actuator speed characteristics using an HMI display, which cannot be implemented in a conventional machine.

DETAILED DESCRIPTION OF THE INVENTION

Technical Problems

Accordingly, the present invention has been made to solve the aforementioned problem occurring in the prior art, and it is an object of the present invention to provide an operator self-tuning method using an electro-hydraulic actuator system, in which an operator can personally tune the speed of a corresponding actuator through a human machine interface (HMI) display instrument in a machine including a plurality of electro-hydraulic actuator systems so as to attain actuator speed characteristics desired by the operator.

For reference, the present invention has a function that cannot be implemented in a machine including an existing fixed hydraulic system. In addition, the present invention enables an operator to personally tune proper actuator speed characteristics in consideration of an operator's characteristics and work environment characteristics, thereby improving productivity of the machine.

In addition, in a machine including a conventional hydraulic actuator system, once a spool design is determined, the speed characteristics of the actuator cannot be modified as long as the spool is not replaced. On the contrary, the present invention enables an operator to personally tune proper actuator speed characteristics in consideration of an operator's characteristics and work environment characteristics, thereby improving productivity of the machine.

Technical Solution

To accomplish the above object, in accordance with an embodiment of the present invention, there is provided an operator self-tuning method using an electro-hydraulic actuator system, the method including: a step of allowing a human machine interface (HMI) to select any one of a plurality of electro-hydraulic actuator (EHA) systems in response to a user's manipulation; a step of displaying a graph in which a mapping relationship of a joystick command vs. an actuator speed command of the selected EHA system is defined; a step of, if a predetermined button (or key) is pressed by the user, tuning a maximum speed of a corresponding actuator by multiplying a pre-stored maximum speed value of an actuator of the selected EHA system by a gain that is increased or decreased in proportion to the number of pressings of the button (or key); and a step of storing the tuned maximum speed of the actuator in an upper controller of the corresponding EHA system.

Preferably, the operator self-tuning method using an electro-hydraulic actuator system in accordance with the present invention may further include: a step of, if it is determined that the user desires to tune the acceleration characteristics of the actuator according to the user's manipulation, allowing the HMI to selecting any one of the plurality of EHA systems in response to the user's manipulation; a step of displaying a graph in which a mapping relationship of the joystick command vs. an actuator acceleration command of the selected EHA system is defined; a step of, if a predetermined button (or key) is pressed by the user, tuning acceleration characteristics of a corresponding actuator by multiplying a pre-stored acceleration characteristic value of an actuator of the selected EHA system by a gain that is increased or decreased in proportion to the number of pressings of the button (or key); and a step of storing the tuned acceleration characteristics of the actuator in an upper controller of the corresponding EHA system.

In addition, the operator self-tuning method using an electro-hydraulic actuator system in accordance with the present invention may further include a step of allowing the HMI to notify the user of the mapping graph of the joystick command vs. the actuator speed command that is tuned whenever the maximum speed value of the actuator is multiplied by the gain through the displaying of the mapping graph.

Preferably, the step of allowing the HMI to select the EHA system nay include: a step of allowing the HMI to select a predetermined operator tuning mode in response to the user's manipulation; a step of, if the operator tuning mode is selected, inquiring whether the user desires to tune the maximum speed of the actuator; and a step of, if the user desires to tune the maximum speed of the actuator is desired as a result of the inquiry, selecting any one of the plurality of EHA systems in response to the user's manipulation.

In addition, the operator self-tuning method using an electro-hydraulic actuator system in accordance with the present invention, between the step of the HMI to select the operator tuning mode and the step of inquiring whether the user desires to tune the maximum speed of the actuator, may further include: a step of inquiring whether to reset the maximum speed value of the actuator to a default value in an initial tuning state; and a step of, if it is desired to reset the maximum speed value according to the user's manipulation as a result of the inquiry, storing an initial mapping table value of the joystick command vs. the actuator speed command in the upper controller of the corresponding EHA system, and on the other hand, if it is not desired to reset the maximum speed value, allowing the program to proceed to the step of inquiring whether it is desired to tune the maximum speed of the actuator.

Advantageous Effect

The operator self-tuning method using an electro-hydraulic actuator system in accordance with an embodiment of the present invention as constructed above has the following advantages.

In a machine using the electro-hydraulic actuator system, the operator can personally tune the actuator speed characteristics using an HMI display instrument and a manipulation button, which cannot be implemented in a conventional machine.

In addition, in a machine including a conventional hydraulic actuator system, once a spool design is determined, the speed characteristics of the actuator cannot be modified as long as the spool is not replaced. On the contrary, the present invention enables an operator to personally tune proper actuator speed characteristics in consideration of an operator's characteristics and work environment characteristics, thereby improving productivity of the machine.

BRIEF DESCRIPTION OF THE DRAWINGS

The above objects, other features and advantages of the present invention will become more apparent by describing the preferred embodiments thereof with reference to the accompanying drawings, in which.

Figure 1:
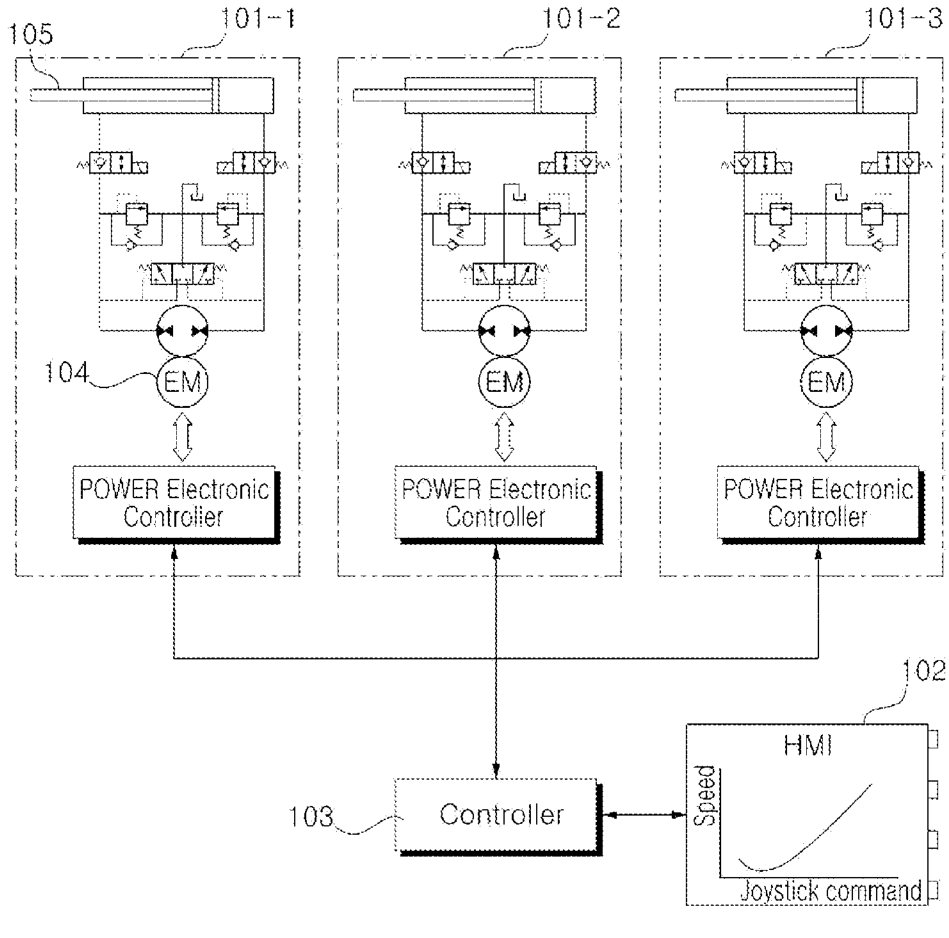
FIG. 1 is a diagrammatic view showing an example of a system to which an operator self-tuning method using an electro-hydraulic actuator system in accordance with the present invention is applied.

| *Explanation on reference numerals of main elements in the drawings* | |
|---|---|
| 7a: branch flow path | |
| 101-1~101-3: EHA systems | 102: HMI |
| 103: upper controller | 104: EM |
| 105: actuator | |

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

In order to definitely describe the present invention, a portion having no relevance to the description will be omitted, and through the specification, like elements are designated by like reference numerals.

In the specification and the claims, when a portion includes an element, it is meant to include other elements, but not exclude the other elements unless otherwise specially stated herein.

FIG. 1 is a diagrammatic view showing an example of a system to which an operator self-tuning method using an electro-hydraulic actuator system in accordance with the present invention is applied.

As shown in FIG. 1, the inventive system includes a plurality of EHA systems 101-1 to 101-3, a HMA 102 that is configured to tune speed characteristics and acceleration characteristics of an actuator of a specific EHA system of the plurality of EHA systems 101-1 to 101-3 in response to a user's manipulation, an upper controller 103 that is configured to control an electric motor (EM) 104 based on the speed characteristics and acceleration characteristics of the actuator, which are tuned by the HMI 102, the EM 104 that is driven using a value of a command tuned by the HMI 102 under the control of the upper controller 103, and an actuator 105 that is operated based on the speed characteristics and acceleration characteristics of the actuator, which are tuned by the HMI 102.

Herein, in order to tune the speed of the actuator, the HMI 102 is operated such that it selects any one of a plurality of electro-hydraulic actuator (EHA) systems 101-1 to 101-3 in response to a user's manipulation, displays a graph in which a mapping relationship of a joystick command vs. an actuator speed command of the selected EHA system is defined, tunes a maximum speed of a corresponding actuator by multiplying a pre-stored maximum speed value of an actuator of the selected EHA system by a gain that is increased or decreased in proportion to the number of pressings of the button (or key) if a user presses a predetermined button (or key) while viewing the displayed graph, and stores the tuned maximum speed of the actuator in the upper controller of the corresponding EHA system.

In addition, in order to tube the acceleration characteristics of the actuator, the HMI 102 is operated such that it selects any one of the plurality of EHA systems 101-1 to 101-3 in response to the user's manipulation if it is determined that the user desires to tune the acceleration characteristics of the actuator according to the user's manipulation, displays a graph in which a mapping relationship of the joystick command vs. an actuator acceleration command of the selected EHA system is defined, tunes acceleration characteristics of a corresponding actuator by multiplying a pre-stored acceleration characteristic value of an actuator of the selected EHA system by a gain that is increased or decreased in proportion to the number of pressings of the button (or key) if a user presses a predetermined button (or key) while viewing the displayed graph; and stores the tuned acceleration characteristics of the actuator in an upper controller of the corresponding EHA system.

In particular, the HMI 102 notifies the user of the mapping graph of the joystick command vs. the actuator speed command that is tuned whenever the maximum speed value of the actuator is multiplied by the gain through the displaying of the mapping graph.

Hereinafter, the step of allowing the HMI 102 to select the EHA system by will be performed.

In other words, first, the HMI 102 selects a predetermined operator tuning mode in response to the user's manipulation, inquires whether the user desires to tune the maximum speed of the actuator if the operator tuning mode is selected, and selects any one of the plurality of EHA systems in response to the user's manipulation if the user desires to tune the maximum speed of the actuator is desired as a result of the inquiry.

In addition, the HMI 102, between the step of the HMI to select the operator tuning mode and the step of inquiring whether the user desires to tune the maximum speed of the actuator, inquires whether to reset the maximum speed value of the actuator to a default value in an initial tuning state, and stores an initial mapping table value of the joystick command vs. the actuator speed command in the upper controller of the corresponding EHA system if it is desired to reset the maximum speed value according to the user's manipulation as a result of the inquiry, and on the other hand, allows the program to proceed to the step of inquiring whether it is desired to tune the maximum speed of the actuator if it is not desired to reset the maximum speed value.

Hereinafter, the operation of the operator self-tuning method using an electro-hydraulic actuator system in accordance with the present invention of FIG. 1 will be described in detail with reference to FIGS. 2 and 3.

Figure 2:
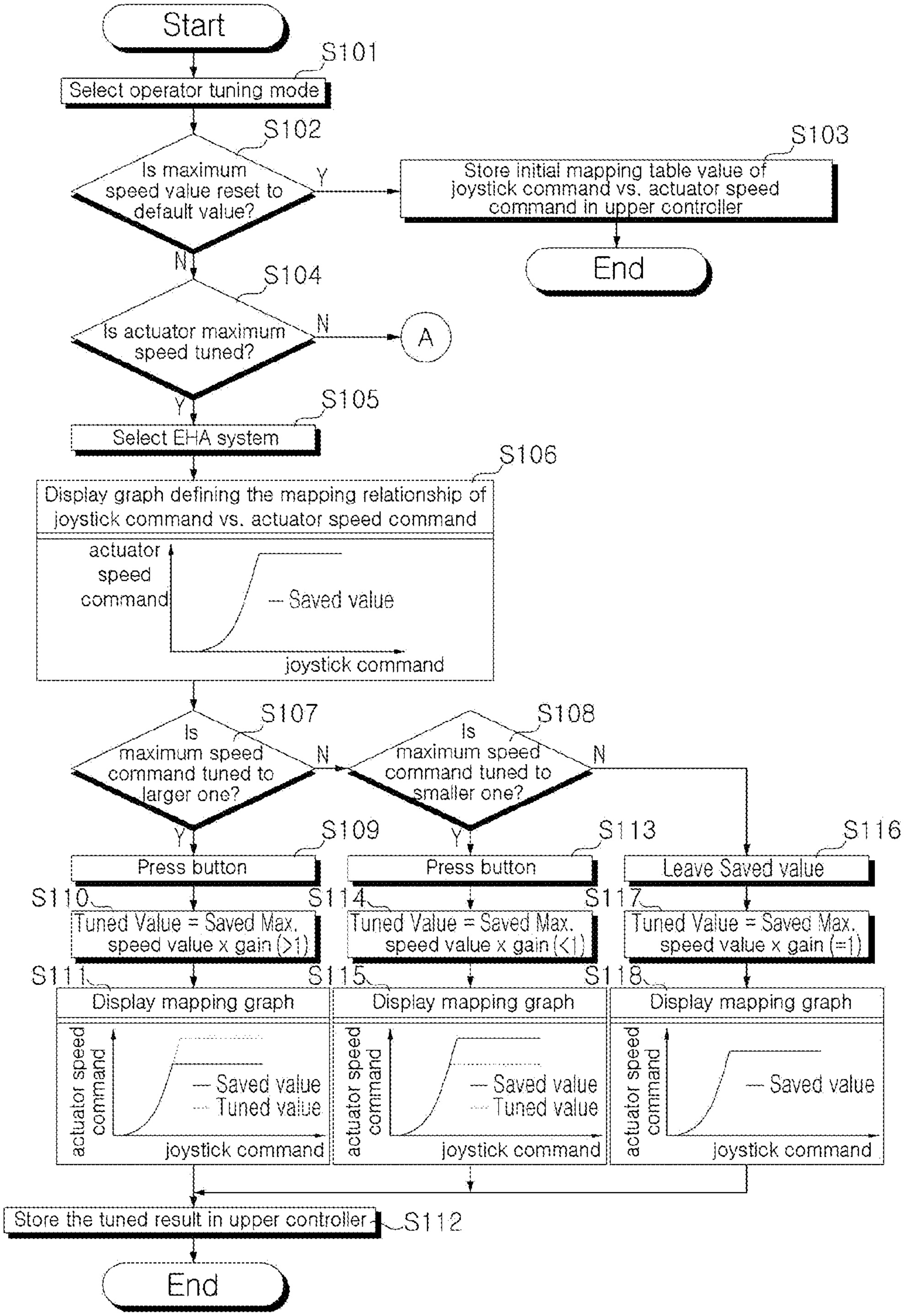
FIGS. 2 and 3 are flowcharts sequentially showing the control operation of an operator self-tuning method using an electro-hydraulic actuator system in accordance with the present invention.
Figure 3:
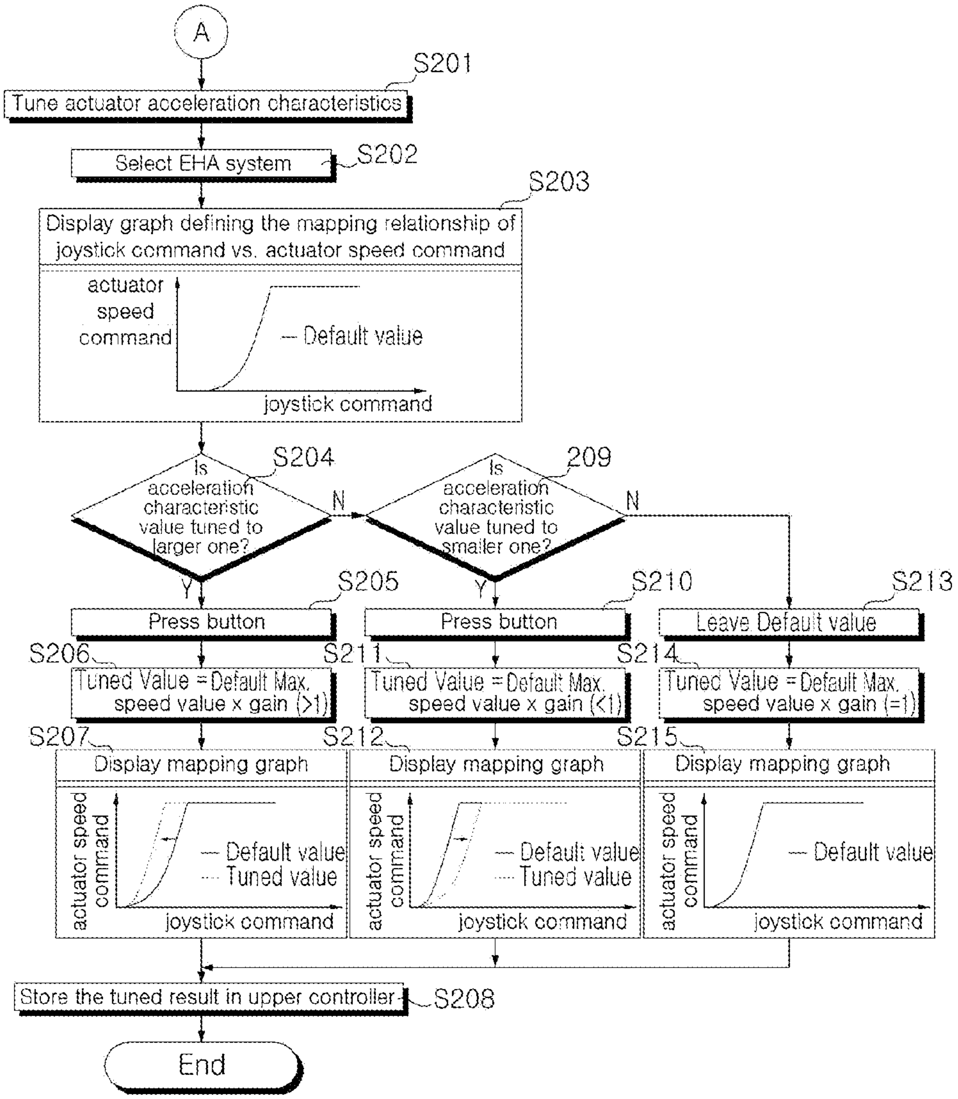

FIGS. 2 and 3 are flowcharts sequentially showing the control operation of an operator self-tuning method using an electro-hydraulic actuator system in accordance with the present invention.

First, as shown in FIG. 2, the HMI is turned on after the start-up of the machine. Thereafter, when an operator selects an operator tuning mode (S101), the HMI inquires whether to reset the maximum speed value of the actuator to a default value in an initial tuning state of the machine (S102).

If the operator desires to reset the maximum speed value to the default value as a result of the inquiry, the HMI stores an initial mapping table value of the joystick command vs. the actuator speed command in the upper controller (S103).

On the other hand, if the operator does not desire to reset the maximum speed value to the default value, the HMI determines that the operator desires to tune the machine and the program proceeds to a subsequent step (S104).

In the subsequent step, the HMI inquires whether the operator desires to tune the maximum speed of the actuator (S104).

As a result of if the operator does not desire to tune the maximum speed of the actuator, the program proceeds to a step of tuning the acceleration characteristics of the actuator. On the other hand, if the operator desires to tune the maximum speed of the actuator is desired as a result of the inquiry, the HMI selects any one of the plurality of EHA systems in response to the operator's manipulation (S105).

Next, the EMI displays a graph in which a mapping relationship of a joystick command vs. an actuator speed command of the EHA system selected by the operator is defined (S106) and inquires whether the operator desires to tune the maximum speed command of the actuator to a larger one (S107).

At this time, if the operator desires to tune the maximum speed of the actuator to a larger one, he or she presses a predetermined button (S109).

Then, the HMI tunes a maximum speed of a corresponding actuator by multiplying a pre-stored maximum speed value of an actuator of the selected EHA system by a gain (>1) that is increased in proportion to the number of pressings of the button (S110).

Thereafter, the HMI notifies the user of the mapping graph of the joystick command vs. the actuator speed command that is tuned whenever the maximum speed value of the actuator is multiplied by the gain (>1) through the displaying of the mapping graph so that the operator can confirm the modified value (S111).

On the other hand, if the operator does not desire to tune the maximum speed of the actuator to a larger one, the program proceeds to a subsequent step where the HMI inquires whether the operator desires to tune the maximum speed of the actuator to a smaller one (S108).

As a result of the inquiry, if the operator desires to tune the maximum speed of the actuator to a smaller one, he or she presses a predetermined button (S109). At this time, the HMI tunes a maximum speed of a corresponding actuator by multiplying a pre-stored maximum speed value of an actuator of the selected EHA system by a gain (<1) that is decreased in proportion to the number of pressings of the button (S114).

Thereafter, the HMI displays the mapping graph of the joystick command vs. the actuator speed command that is tuned whenever the maximum speed value of the actuator is multiplied by the gain (<1) so that the operator can confirm the modified value (S115).

Finally, if the operator does not desire to tune the maximum speed of the actuator, the HMI multiplies the maximum speed value of an actuator of the selected EHA system by a gain (=1) so that the tuned value equals to a previous value (S116 to S118).

In the end, the HMI stores the tuned result in the upper controller, and terminates the program (S112).

Additionally, the operator may perform the tuning of the acceleration characteristics of the actuator.

In other words, as shown in FIG. 3, if the operator desires to tune a preset acceleration characteristic value to a larger one, he or she presses a predetermined button (S201 to S205).

At this time, the HMI tunes the acceleration characteristics of a corresponding actuator by multiplying a pre-stored acceleration characteristic value of the actuator of the selected EHA system by a gain (>1) that is increased in proportion to the number of pressings of the button (S206).

Then, the HMI displays the mapping graph of the joystick command vs. the actuator speed command that is tuned whenever the acceleration characteristic value of the actuator is multiplied by the gain (>1) so that the operator can confirm the modified value (S207).

On the other hand, if the operator does not desire to tune a preset acceleration characteristic value to a larger one, the program proceeds to a subsequent step where the HMI inquires whether the operator desires to tune the acceleration characteristic value of the actuator to a smaller one (S209).

As a result of the inquiry, if the operator desires to tune the acceleration characteristic value of the actuator to a smaller one, he or she presses a predetermined button (S210). At this time, the HMI tunes the acceleration characteristics of a corresponding actuator by multiplying a pre-stored acceleration characteristic value of an actuator of the selected EHA system by a gain (<1) that is decreased in proportion to the number of pressings of the button (S211).

Thereafter, the HMI displays the mapping graph of the joystick command vs. the actuator speed command that is tuned whenever the acceleration characteristic value of the actuator is multiplied by the gain (<1) so that the operator can confirm the modified value (S212).

Finally, if the operator does not desire to tune the acceleration characteristic value of the actuator, the HMI multiplies the acceleration characteristic value of an actuator of the selected EHA system by a gain (=1) so that the tuned value equals to a previous value (S213 to S215).

In the end, the HMI stores the tuned result in the upper controller, and terminates the program (S208).

As described above, the present invention enables an operator can personally tune a lookup table of a joystick command vs. an actuator speed command through an HMI display instrument in a machine including a plurality of electro-hydraulic actuator systems, so that the operator can personally tune the acceleration characteristics of the actuator to desired actuator speed characteristics, unlike a machine including only existing fixed actuator speed characteristics.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

INDUSTRIAL APPLICABILITY

As described above, according to the present invention as constructed above, an operator can personally tune a lookup table of a joystick command vs. an actuator speed command through a human machine interface (HMI) display instrument in a machine including a plurality of electro-hydraulic actuator systems, so that the operator can personally tune the acceleration characteristics of the actuator to desired actuator speed characteristics, unlike a machine including only existing fixed actuator speed characteristics.

The invention claimed is:

1. An operator self-tuning method using an electro-hydraulic actuator system comprising:

a step of receiving, by a human machine interface (HMI), a user's manipulation to select any one of a plurality of electro-hydraulic actuator (EHA) systems in response to the user's manipulation on a display instrument;

a step of displaying, by the display instrument, a graph in which a mapping relationship of a joystick command vs. an actuator speed command of the selected EHA system is defined;

a step of, if a predetermined button (or key) is pressed by the user, tuning a maximum speed of a corresponding actuator by multiplying a pre-stored maximum speed value of an actuator of the selected EHA system by a gain that is increased or decreased in proportion to the number of pressings of the button (or key), by an upper controller; and a step of storing, by the HMI, the tuned maximum speed of the corresponding actuator to the upper controller of the corresponding EHA system, wherein the corresponding actuator is operated based on the tuned maximum speed.

2. The operator self-tuning method using an electro-hydraulic actuator system according to claim 1, further comprising:

a step of, if it is determined that the user desires to tune the acceleration characteristics of the actuator according to the user's manipulation, receiving, by the HMI, the user's manipulation to select any one of the plurality of EHA systems in response to the user's manipulation on the display instrument;

a step of displaying, by the display instrument, a graph in which a mapping relationship of the joystick command vs. an actuator acceleration command of the selected EHA system is defined;

a step of, if a predetermined button (or key) is pressed by the user, tuning acceleration characteristics of a corresponding actuator by multiplying a pre-stored acceleration characteristic value of an actuator of the selected EHA system by a gain that is increased or decreased in proportion to the number of pressings of the button (or key), by the upper controller; and a step of storing, by the HMI, the tuned acceleration characteristics of the corresponding actuator to the upper controller of the corresponding EHA system;

wherein the corresponding actuator is operated based on the tuned acceleration characteristics.

3. The operator self-tuning method using an electro-hydraulic actuator system according to claim 1, further comprising a step of notifying, by the HMI, the user of the mapping graph of the joystick command vs. the actuator speed command that is tuned whenever the maximum speed value of the actuator is multiplied by the gain through the displaying of the mapping graph on the display instrument.

4. The operator self-tuning method using an electro-hydraulic actuator system according to 3, wherein the step of receiving, by the HMI, the user's manipulation to select the EHA system comprises:

a step of receiving, by the HMI, the user's manipulation to select a predetermined operator tuning mode in response to the user's manipulation on the display instrument;

a step of, if the operator tuning mode is selected, inquiring, by the HMI, whether the user desires to tune the maximum speed of the actuator; and a step of, if the user desires to tune the maximum speed of the actuator is desired as a result of the inquiry, receiving, by the HMI, the user's manipulation to select any one of the plurality of EHA systems in response to the user's manipulation on the display instrument.

5. The operator self-tuning method using an electro-hydraulic actuator system according to claim 4, between the step of receiving, by the HMI, the user's manipulation to select the operator tuning mode and the step of inquiring whether the user desires to tune the maximum speed of the actuator, further comprising:

a step of inquiring, by the HMI whether to reset the maximum speed value of the actuator to a default value in an initial tuning state; and a step of, if it is desired to reset the maximum speed value according to the user's manipulation as a result of the inquiry, storing, by the HMI, an initial mapping table value of the joystick command vs. the actuator speed command to the upper controller of the corresponding EHA system, and on the other hand, if it is not desired to reset the maximum speed value, receiving by the HMI, the user's manipulation to proceed to the step of inquiring whether it is desired to tune the maximum speed of the actuator on the display instrument.

6. The operator self-tuning method using an electro-hydraulic actuator system according to claim 2, further comprising a step of notifying, by the HMI, the user of the mapping graph of the joystick command vs. the actuator speed command that is tuned whenever the maximum speed value of the actuator is multiplied by the gain through the displaying of the mapping graph on the display instrument.

7. The operator self-tuning method using an electro-hydraulic actuator system according to 6, wherein the step of receiving, by the HMI, the user's manipulation to select the EHA system comprises on the display instrument:

a step of allowing the HMI to select a predetermined operator tuning mode in response to the user's manipulation;

a step of, if the operator tuning mode is selected, inquiring, by the HMI, whether the user desires to tune the maximum speed of the actuator on the display instrument; and a step of, if the user desires to tune the maximum speed of the actuator is desired as a result of the inquiry, receiving, by the HMI, the user's manipulation to select any one of the plurality of EHA systems in response to the user's manipulation on the display instrument.

8. The operator self-tuning method using an electro-hydraulic actuator system according to claim 7, between the step of receiving, by the HMI, the user's manipulation to select the operator tuning mode and the step of inquiring, by the HMI, whether the user desires to tune the maximum speed of the actuator, further comprising:

a step of inquiring, by the HMI, whether to reset the maximum speed value of the actuator to a default value in an initial tuning state on the display instrument;

a step of, if it is desired to reset the maximum speed value according to the user's manipulation as a result of the inquiry, storing, by the HM, an initial mapping table value of the joystick command vs. the actuator speed command to the upper controller of the corresponding EHA system, and on the other hand, if it is not desired to reset the maximum speed value, receiving, by the HMI, the user's manipulation to proceed to the step of inquiring whether it is desired to tune the maximum speed of the actuator on the display instrument.

* * * * *